No. 642,559. Patented Jan. 30, 1900.
E. M. PARKHURST.
ACETYLENE GAS LAMP.
(Application filed Feb. 24, 1899.)

(No Model.) 2 Sheets—Sheet 1.

Witnesses:—
Inventor:—
Emmons M. Parkhurst
by his Attorneys
Howson & Howson

No. 642,559. Patented Jan. 30, 1900.
E. M. PARKHURST.
ACETYLENE GAS LAMP.
(Application filed Feb. 24, 1899.)

(No Model.) 2 Sheets—Sheet 2.

Witnesses:-
Frank L. A. Graham
Louis M. F. Whitehead

Inventor:-
Emmons M. Parkhurst
by his Attorneys:-
Howson & Howson

UNITED STATES PATENT OFFICE.

EMMONS M. PARKHURST, OF PHILADELPHIA, PENNSYLVANIA, ASSIGNOR, BY DIRECT AND MESNE ASSIGNMENTS, TO THE AMERICAN CARBIDE LAMP COMPANY, OF SAME PLACE.

ACETYLENE-GAS LAMP.

SPECIFICATION forming part of Letters Patent No. 642,559, dated January 30, 1900.

Application filed February 24, 1899. Serial No. 706,727. (No model.)

*To all whom it may concern:*

Be it known that I, EMMONS M. PARKHURST, a citizen of the United States, residing in Philadelphia, Pennsylvania, have invented certain Improvements in Acetylene-Gas Lamps, of which the following is a specification.

My invention relates to certain improvements in acetylene-gas lamps.

The main object of my invention is to make a simple, neat, and compact lamp in which the gas is generated and in which the movable portion of the gas-holder carries the water-tank and carbid-holder.

A further object of my invention is to prevent the passage of gas into the water-holder when making gas.

Figure 1:
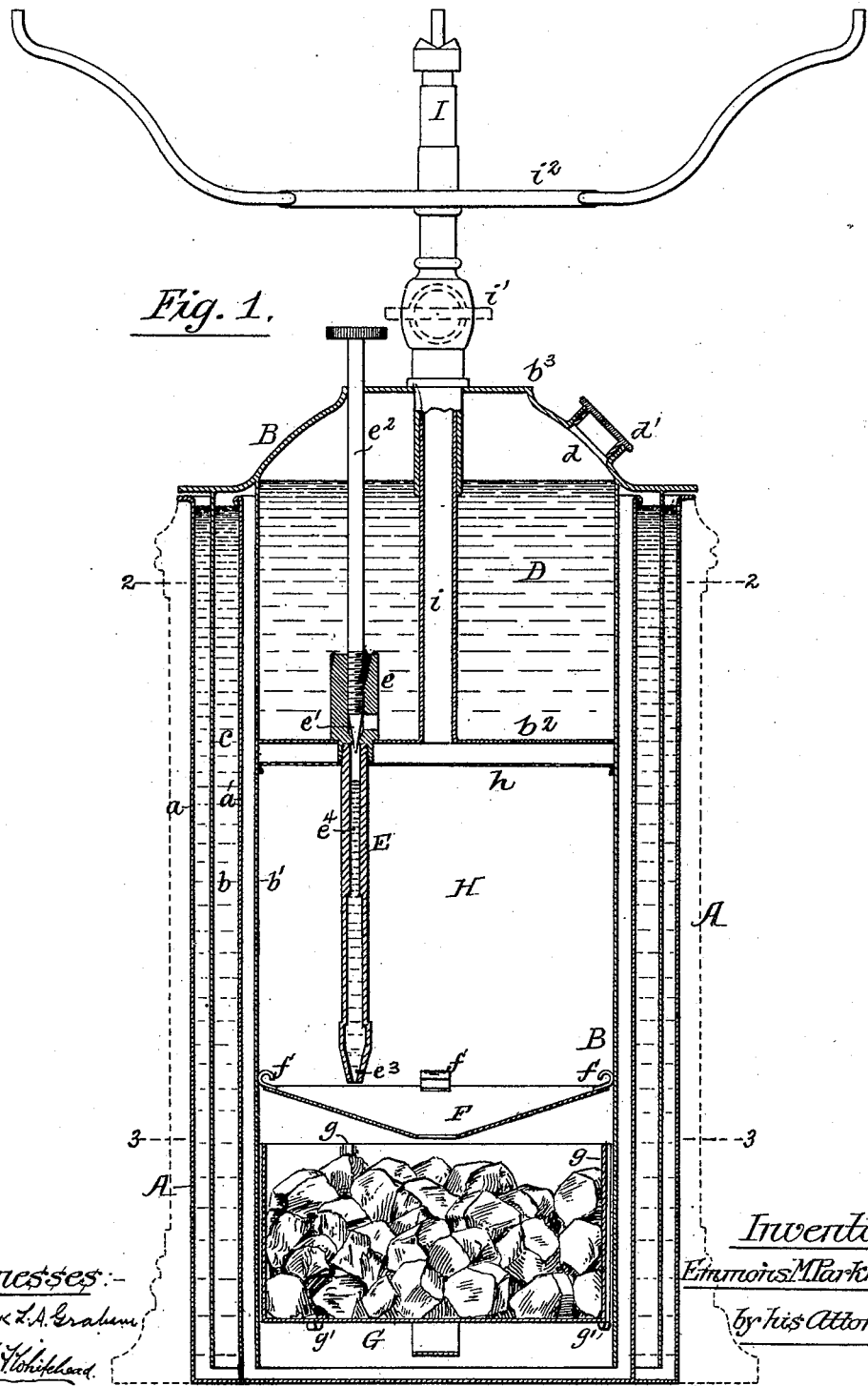
Figure 2:
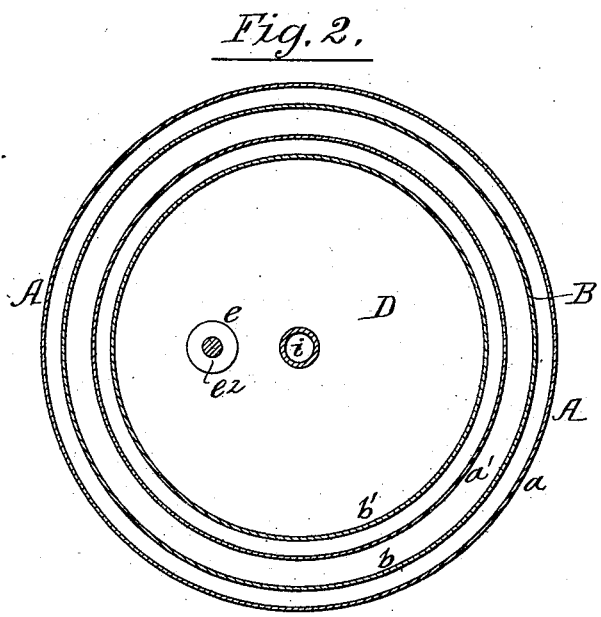
Figure 3:
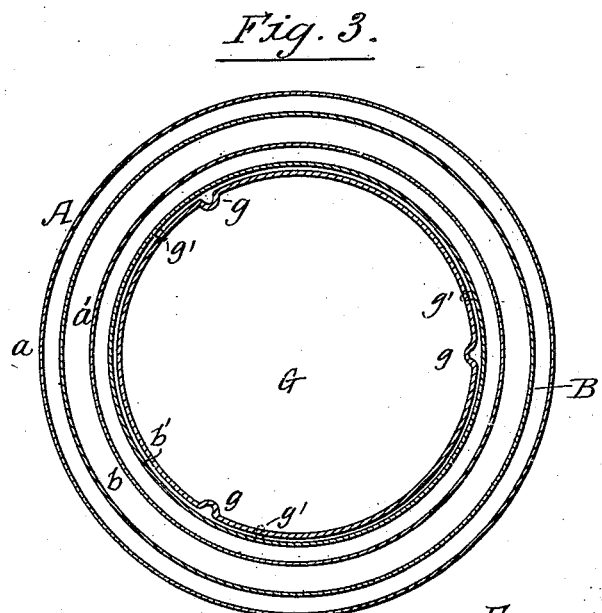

In the accompanying drawings, Figure 1 is a vertical sectional view of my improved acetylene-gas lamp. Fig. 2 is a sectional plan view on the line 2 2, Fig. 1; and Fig. 3 is a sectional plan view on the line 3 3, Fig. 1.

A is the body of the lamp, having two walls $a\ a'$, forming the water-chamber $c$.

B is the movable portion of the structure, having two walls $b\ b'$. The wall $b$ is adapted to the space between the walls $a\ a'$, so that when water is introduced into the space $c$ a perfect seal is secured.

D is the water-chamber, formed by the casing $b'$ of the portion B and a bottom $b^2$ and top plate $b^3$.

$d$ is an opening provided with a cap $d'$, by which the chamber can be filled with water.

E is a long straight tube screwed into the valve-casing $e$ within the water-chamber D, extending to a point directly above the carbid-holder, and adapted to this casing is a needle-valve $e'$, having a stem $e^2$, which projects beyond the casing and is provided with a suitable handle. The tube has a reduced nozzle $e^3$, through which the water must flow, so that there is a constant body of water within this tube to prevent the gas from finding its way into the water-chamber and out through the air-opening therein, as air must be introduced into the upper portion of the chamber to allow the water to freely flow from the chamber.

I preferably make the long tube E with two enlargements, as shown, so that when the gas is produced the pressure will tend to keep a large body of water within the tube and prevent gas passing through the narrow portion $e^4$ of the tube and past the needle-valve.

F is a tapered drip-pan having a central opening, so that the water will flow onto the pan before passing to the carbid, which is contained in a holder G. This pan is detachably mounted in the section B and so arranged that the gas can pass freely around it.

$i$ is the gas-outlet passage, passing through the water-chamber D and communicating with the burner I and may be provided with a suitable gas-cock $i'$. $i^2$ is a shade-holder which may be used to hold a shade when the lamp is used as a table-lamp.

I mount the carbid-holder G loosely within the body of the movable section and secure it therein by a suitable fastening. In the present instance I have shown pins $g'$ on the section B, and in the holder are channels $g$, so that the holder can be readily slipped in place and turned so as to be supported by the pins. While the holder G is carried by the movable section, the gas can freely escape around it into the main chamber A, so that when the pressure of gas increases over and above a certain pressure the movable section will be elevated according to the pressure, and the user of the lamp can readily see when the lamp is making more gas than is used, and the needle-valve $e'$ is turned accordingly. By carrying the water-chamber and the carbid-holder on the movable section I am enabled to at all times keep the two in a fixed position one in respect to the other.

I place a fine screen $h$ directly under the bottom of the water-chamber, so that the gas passing to the burner must flow through this screen, and consequently any moisture or foreign material carried by the gas will be caught by the screen and prevented from clogging the burner. This screen is made detachable, so that it can be taken out and cleaned or renewed when necessary.

The body A can be mounted in any suitable ornamental receptacle—as, for instance, that shown in dotted lines on the drawings.

The operation of the lamp is as follows: Water is placed in the sealing-chamber $c$ to the depth desired, or mercury or other equivalent material may be used to form the gas-seal. Carbid in suitable quantities is placed within the holder G and the holder secured to the movable section B of the lamp, which is then placed within the casing A and the water-chamber D filled with water. The needle-valve $e'$ is then turned so as to allow water to enter the long tube E, and this water will drip onto the plate F and from the plate onto the carbid. The gas produced will fill the chamber H, and according to the pressure will raise the section B. The gas escaping from the burner is ignited. The amount of gas produced is regulated by the water-valve $e'$. In some instances the gas-valve $i'$ is also used, but can be omitted in the simpler forms of lamps. By this arrangement I am enabled to make the lamp self-contained, and the water to produce the gas will weight the movable section sufficiently to produce the desired pressure at first. The amount of pressure is regulated solely by the needle-valve $e'$. The water in the long tube E prevents the passage of gas into the water-chamber, which in some lamps is a great defect, as the water-chamber must have an air-inlet, and in the present instance this air-inlet is a small hole made in the cap $d'$, so as to allow for the passage of air into the chamber.

The gas as it is produced is immediately burned, and as soon as it is desired to shut off the gas the water-supply valve is closed.

If it is wished to replenish the lamp with carbid, all that is necessary is to remove the portion D and place fresh material in the holder G, refill the chamber D with water, and the lamp is ready for use.

I claim as my invention—

1. In an acetylene-lamp, the combination with a casing having a circumferential sealing-chamber, of a removable section having a wall projecting into the sealing-chamber to form a gas-seal and adapted to be elevated by the internal pressure of the gas, a water-supply chamber in the upper portion of said removable section, a carbid-receptacle carried by the removable section below the water-chamber, and adapted to be removed through the bottom portion of said removable section, a valved duct for permitting water to flow to the carbid and a burner; substantially as described.

2. In an acetylene-lamp, the combination with a casing having a circumferential sealing-chamber, of a removable section having a wall projecting into the sealing-chamber to form a gas-seal and adapted to be elevated by the internal pressure of the gas, a water-supply chamber in the upper portion of said removable section, a carbid-receptacle removably mounted in the lower portion of the removable section, and adapted to be removed through the bottom of said removable section, a valved duct controlling the flow of water from the chamber to the carbid and a burner; substantially as described.

3. In an acetylene-lamp, the combination with an outer casing having concentric walls forming a seal-chamber between them, of a floating, removable casing having concentric walls, one entering the seal-chamber and the other extending down into the inner chamber formed by the concentric walls of the outer casing, a water-chamber formed in the upper portion of the inner chamber of the movable section, a carbid-receptacle removably mounted in the lower portion of said last-mentioned chamber and adapted to be removed through the bottom part thereof, a valved drip-tube depending from the bottom of the water-chamber and a gas-duct extending up through the water-chamber; substantially as described.

4. In an acetylene-lamp, the combination with the gas-holder, carbid-receptacle and water-reservoir located directly above the carbid-receptacle, of a drip-tube, for supplying water to the carbid, depending from the water-reservoir with a needle-valve at its entrance end and a free straight vertical passage extending from the upper to the lower end of the tube, a portion of said passage at the top being of small cross-sectional area and capacity, and below such portion being enlarged to form a water-chamber and at the lower end being constricted; substantially as described.

In testimony whereof I have signed my name to this specification in the presence of two subscribing witnesses.

EMMONS M. PARKHURST.

Witnesses:
 WILL. A. BARR,
 JOS. H. KLEIN.